United States Patent [19]

Hesprich et al.

[11] Patent Number: 4,529,148
[45] Date of Patent: Jul. 16, 1985

[54] ROLL OF WOUND CONDUIT TUBING WITH PRETHREADED PULL LINE

[75] Inventors: Donald N. Hesprich; William P. Ware, both of Charlotte, N.C.

[73] Assignee: Thomas Industries, Inc., Matthews, N.C.

[21] Appl. No.: 579,778

[22] Filed: Feb. 13, 1984

[51] Int. Cl.³ .......................................... B65H 55/00
[52] U.S. Cl. ............................ 242/159; 254/134.3 R; 254/134.4; 206/389; 138/103; 242/1
[58] Field of Search ............... 242/159, 166, 172, 174, 242/176, 177, 178, 54 R, 85, 86, 86.5 R, 1, 125.1, 125.2; 206/804, 303, 389; 138/103, 108, 114, 121, 122; 74/501 R; 254/134.3 R, 134.3 FT, 134.4

[56] References Cited

U.S. PATENT DOCUMENTS

| | | | |
|---|---|---|---|
| 2,644,983 | 7/1953 | Curtiss | 18/14 |
| 3,013,443 | 12/1961 | Morse | 74/501 |
| 3,120,947 | 2/1964 | Hamrick | 254/134.4 |
| 3,179,375 | 4/1965 | Hamrick | 254/134.4 |
| 3,246,878 | 4/1966 | Hamrick | 254/134.4 |
| 3,689,982 | 9/1972 | Campbell | 29/430 |
| 3,719,982 | 3/1973 | Tindal | 29/452 |
| 3,778,878 | 12/1973 | Bindari | 29/200 R |
| 3,892,912 | 7/1975 | Hauck | 174/68 |
| 3,927,866 | 12/1975 | Linquist | 254/134.4 |
| 3,946,480 | 3/1976 | Dienes | 29/235 |
| 4,137,623 | 2/1979 | Taylor | 29/433 |

Primary Examiner—Stanley N. Gilreath
Attorney, Agent, or Firm—Bell, Seltzer, Park & Gibson

[57] ABSTRACT

An apparatus for facilitating field installation of electrical conduit and fiber optic lines in a conduit and a method of providing pull line in such apparatus.

A roll of wound conduit tubing having a length of over 700 feet is provided with a pull line extending through the entire length of the wound tubing. The pull line has a tensile strength of about 45 pounds such that it will have sufficient strength to accomplish field pulling operations.

7 Claims, 7 Drawing Figures

ROLL OF WOUND CONDUIT TUBING WITH PRETHREADED PULL LINE

FIELD OF THE INVENTION

This invention relates to an apparatus adapted for installing electrical conductor and fiber optic lines in extended lengths of conduit tubing and a method of forming same.

BACKGROUND OF THE INVENTION

Electrical conductor lines when installed in buildings or underground are usually surrounded and protected by corresponding lengths of conduit. Fiber optic lines used for transmission of communication signals likewise are surrounded by conduit and run in a similar manner.

Typically these lines and the surrounding conduit run for extended distances of thousands of feet under streets through systems of interconnected tunnels with access manholes. Installation of the lines in the subterranean conduit tubing has been a very difficult matter requiring substantial time and effort, particularly in light of the cramped conditions present in the field.

Typical past practice has involved excavating tunnel areas, installing the desired network of conduit tubing and then installing the conductor or transmission lines in the conduit. This latter has been accomplished by running a strong and heavy pull rope or cable in the conduit, attaching the pull rope to the conductor line, and then pulling the pull rope back through the length of conduit and the conductor line along with it. In order to accomplish this operation it is first necessary, however, to run the pull rope through the conduit. This has been done in the past typically by using means and apparatus such as shown in U.S. Pat. Nos. 3,006,607; 3,120,947; and 3,246,878 (all issued to assignee herein) wherein a lighter weight pull line is run through the conduit by fluid pressure pushing or pulling through the conduit a line package of pull line. The pull line is then connected to the heavier pull rope and pulled back through the conduit, pulling the pull rope back through with it. The line package of pull line usually has been provided as a single cylindrical shaped package up to about six inches in length with an outside diameter less than the inside diameter of the conduit. Such a package has contained up to about 500-600 feet of pull line having about a 27 pound tensile strength.

These figures represent what has been considered to be a maximum length and size for pull line, since use of a package comprising greater quantities of heavier line would yield a package of a size that could not readily be passed through the conduit, particularly the curves and bends thereof. Although a greater quantity of lighter weight line could yield a package of smaller size that could be accommodated by the conduit, the line would not be strong enough to pull back the heavier pull line through the conduit—particularly conduit extending the longer distances of over six hundred feet.

Being restricted to use of these shorter distances meant that repeated installation operations were required at multiple locations and that numerous line splicings were required in the field. Such numerous splicings of conductor lines were undesirable since in addition to the additional expenditure of manpower and effort required to effect the splicing operations, the presence of the splice typically adversely affected the electrical conductivity of the line and required the installation of additional electrical amplification units.

Furthermore, the problems created by splicing have become even more acute recently in connection with the installation and splicing of fiber optic lines for communication signal transmission. Splicing of fiber optic lines is a technically difficult procedure in the first place requiring skilled techniques to properly accomplish. Furthermore, fiber optic line splices tend to substantially adversely affect the transmitted signal and typically require additional electronic means to correct adverse effects caused by the splices.

Accordingly, it has become quite desirable to install longer continuous lengths of conductor lines, and particularly fiber optic lines, in conduit.

SUMMARY OF THE INVENTION

The present invention overcomes the above disadvantages by providing an improved apparatus which permits ready installation of uninterrupted lengths of electrical conductor and fiber optic lines in extended lengths of conduit.

Another object of the invention is to provide a line installation apparatus including a roll of wound conduit having a length of over 700 feet and a pull line extending therethrough, said pull line having sufficient tensile strength to accomplish subsequent line installation.

Another object of the invention is to provide a line installation apparatus including a roll of wound conduit having a length of over 700 feet and a pull line extending therethrough, said pull line being stretchable to provide an increased effective length of pull line for use when the coil of conduit is unwound.

Another object of the invention is to provide a line installation apparatus including a roll of conduit wound on a flanged carrier and said conduit having a length of over 700 feet and a pull line extending therethrough, with said flanged carrier having openings in its flanges to permit ready access to the ends of the conduit wound thereon.

Another object of the invention is to provide a pull line in a roll of conduit tubing by extruding such tubing and concurrently feeding a pull line therethrough.

Another object of the invention is to provide a pull line in a roll of conduit tubing by passing a unitary line package comprising a plurality of line package units therethrough while successively unwinding pull line from the line package units.

BRIEF DESCRIPTION OF THE DRAWINGS

Further and more specific objects and advantages of the invention will become more apparent as the description proceeds, when taken in connection with the accompanying drawings, in which.

DETAILED DESCRIPTION OF THE INVENTION

While the present invention will be described more fully hereinafter with reference to the accompanying drawings, in which particular embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
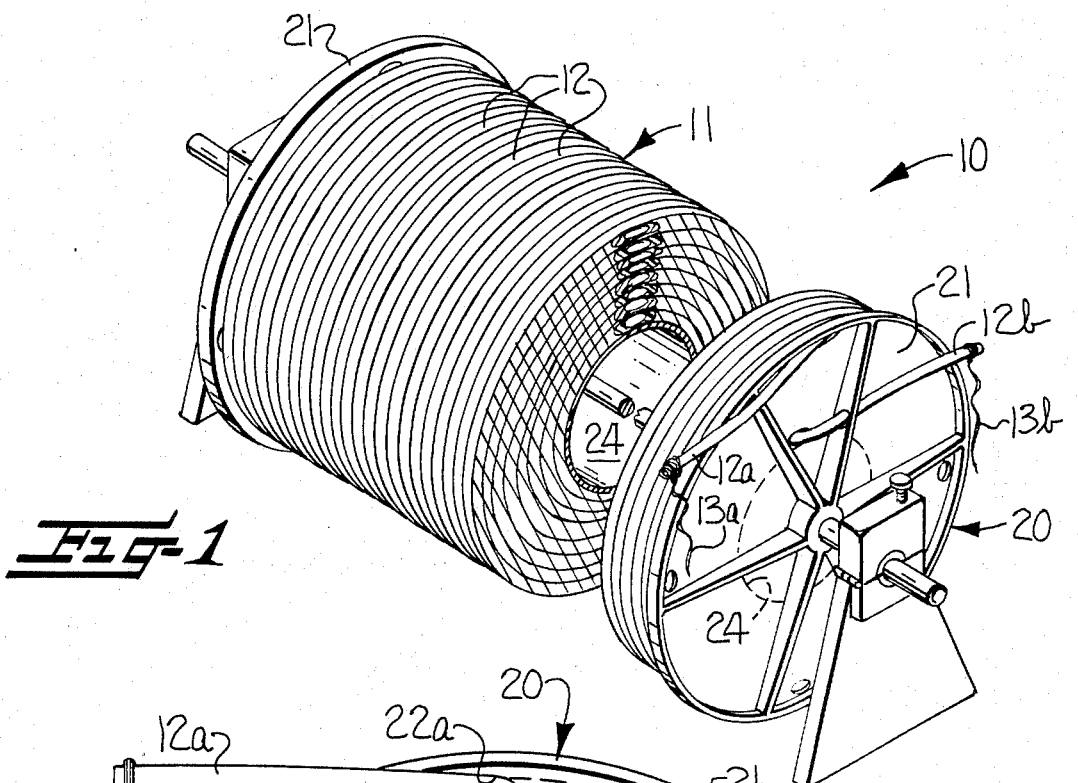
FIG. 1 is a perspective view of the apparatus of the invention with a portion of the roll of wound tubing of the apparatus broken away for clarity.
Figure 2:
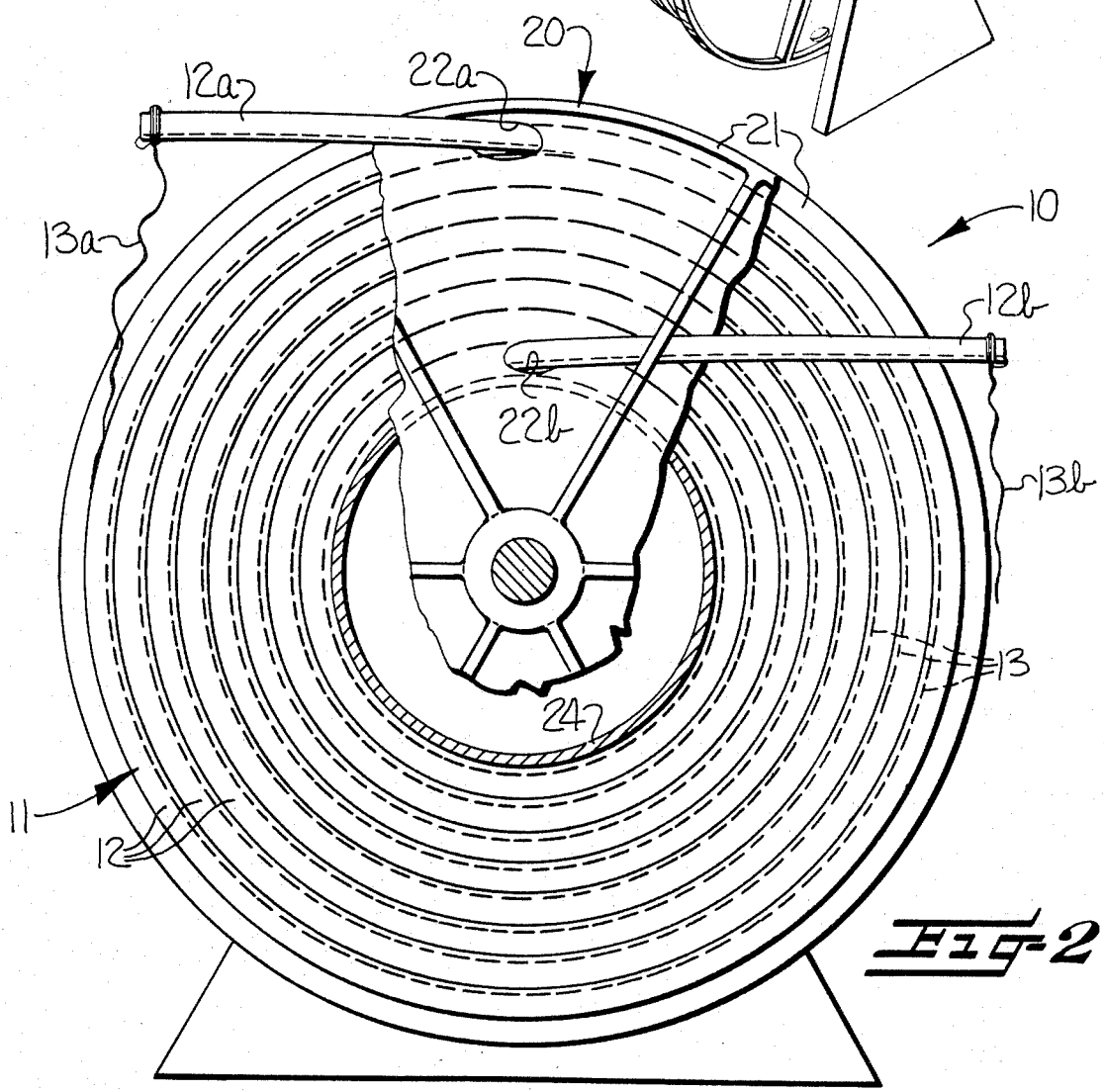
FIG. 2 is a fragmentary side elevational view of the apparatus of the invention, substantially shown in longitudinal section for clarity.

Referring now to the drawings, FIGS. 1 and 2 illustrate the overall apparatus of the invention which is an apparatus for facilitating field installation of electrical conductor or fiber optic lines in extended length conduit tubing to be installed in the field. More specifically, this apparatus 10 includes a roll 11 of wound conduit tubing 12 having a continuous and desirably uninterrupted length of at least 700 feet and up to that length which is needed to span the particular distance being run.

Extending through the entire length of the wound tubing 12 is a pull line 13 with opposite ends 13a, 13b of the pull line 13 being secured, such as being tied around, adjacent respective opposite ends 12a, 12b of the wound tubing 12. This pull line 13 is typically composed of a nylon material having a tensile strength of at least about 45 pounds. Tubing 12 may be formed of a plastic such as polyvinyl chloride or polyethylene or flexible metal such as steel or aluminum. Also, if desired, the conduit tubing may be corrugated for additional strength and flexibility.

Tubing 12 intended to be used to accommodate fiber optic lines is typically about 1" in inside diameter or smaller, while tubing 12 intended to be used to accommodate electrical conductor lines is typically of a larger diameter.

Tubing 12 is desirably wound on a flanged reel 20 having openings 22a, 22b in the flanges 21 thereof through which the opposite ends 12a, 12b of the tubing 12 extend for ready access thereto. Reel hub 24 usually has an outside diameter of about 18 inches.

Apparatus 10 is desirably made up in a shop facility for general or special applications in the field. Shipped to the field in the form shown, there is thus provided a roll 11 of wound conduit tubing 12 having a pull line extending through the entire length of the wound tubing 12. Assuming that a sufficient length of tubing 12 is supplied on the roll 11, continuous runs of conduit of thousands of feet may be dispensed from such rolls 11, so as to span multiple bays of underground passage tunnels without having to resort to undesirable splicing. Also, there is thus provided conduit tubing 12 which can be unreeled and cut to the length desired.

Furthermore, and importantly, these continuous and uninterrupted lengths of conduit tubing 12 already contain a pull line 13 extending through the entire length thereof which means that when a given length of tubing 12 is put in place it already contains the means, the pull line 13, to readily pull a length of pull rope through the tubing 12 without having to resort to any fluid pressure power source in the field. This is of great advantage since it saves costly and burdensome field operations.

Although the pull line 13 typically provided in tubing 12 is a line having a diameter substantially smaller than the inside diameter of the tubing 12 and a pull strength of no more than about 100 pounds, there may alternatively be provided a roll 11 of tubing being provided with a pull line 13 having a larger diameter approaching that of the inside diameter of tubing 12 and a pull strength of up to 500 to 1,000 pounds. Such pull line 13 is thus effectively a pull rope making it possible in some cases to directly pull through conductor or fiber optic lines in the conduit tubing 12 without having to resort to the interim field step of pulling through a pull rope. This can be highly advantageous in certain installations.

During the course of unrolling lengths of tubing 12 in the field and making them ready for use and installation, it should be realized that care should be taken to ensure that an end of pull line 13 remains readily available adjacent each severed length of tubing 12. This is not as easy as it might first appear.

Firstly, pull line 13 may be positioned in the wound roll 11 of tubing 12 in a minimum diameter fashion as opposed to being positioned consistently along the mean center line diameter of the tubing 12 of the wound roll 11. The result is that the actual length of pull line 13 in the wound tubing 12 will be less by some several percent than the actual straight or rectilinear length of the tubing 12 when the tubing is unwound. This line "shrinkage" can present a substantial problem in the field when lengths of tubing 12 are unwound. If one end of the pull line 13 is lost within the length of tubing, the effectiveness of the positioned pull line 13 is lost. Accordingly, it is desirable to provide pull line 13 that is stretchable so that an increased effective length of pull line 13 is available to compensate for the needed additional length of line when the tubing 12 is unwound.

Furthermore, when tubing 12 is corrugated, the additional length needed is greater. And, when tubing 12 is being installed in the field, its length may be stretched such that additional stretch compensation in the pull line 13 will be required. To meet these needs it is thus desirable that the pull line 13 be constructed so that it is stretchable at least about 15% in length.

Figure 3:
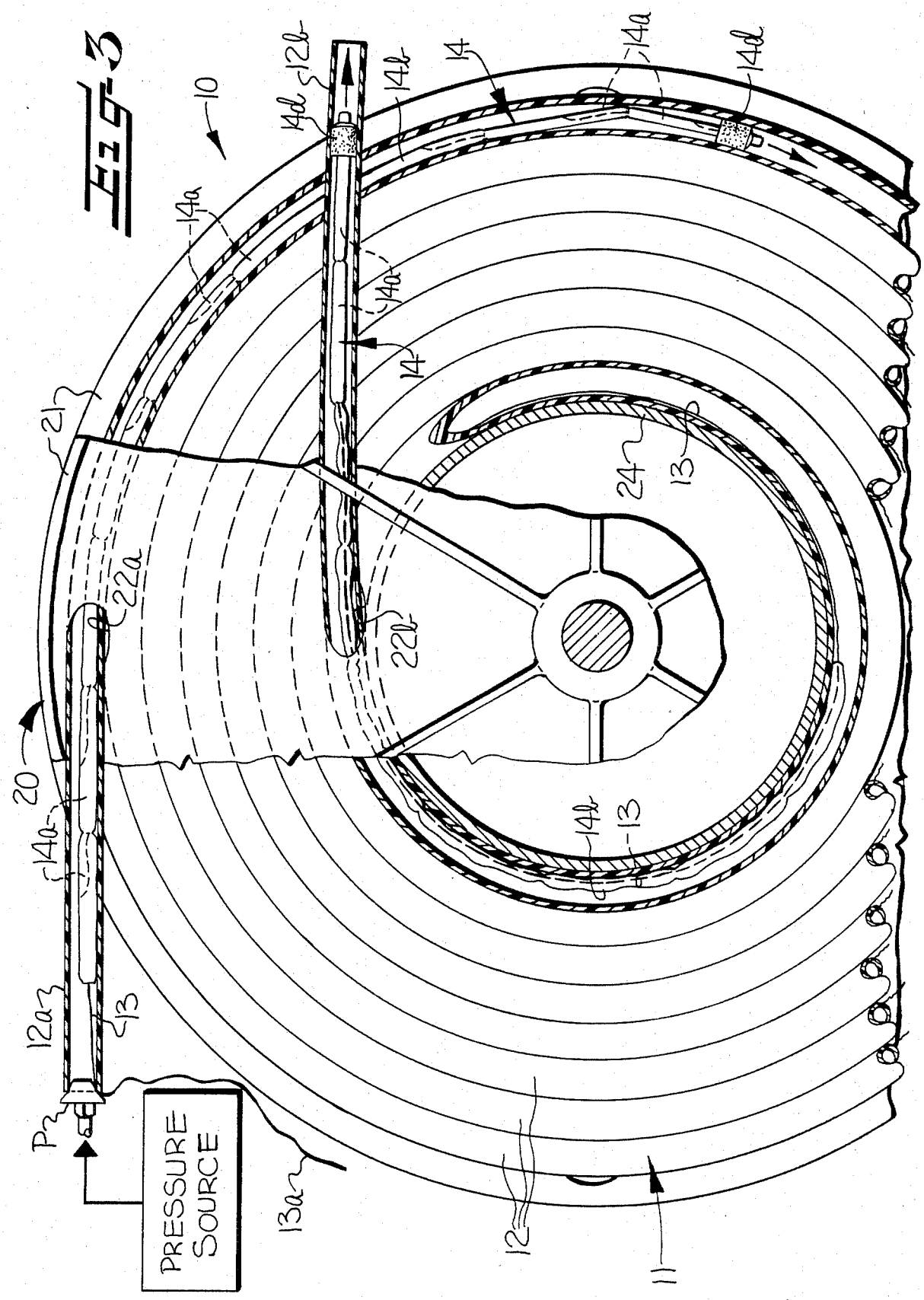
FIG. 3 is an expanded view similar to FIG. 2 illustrating a method of placing pull line in the roll of tubing of the apparatus of the invention.
Figure 4:
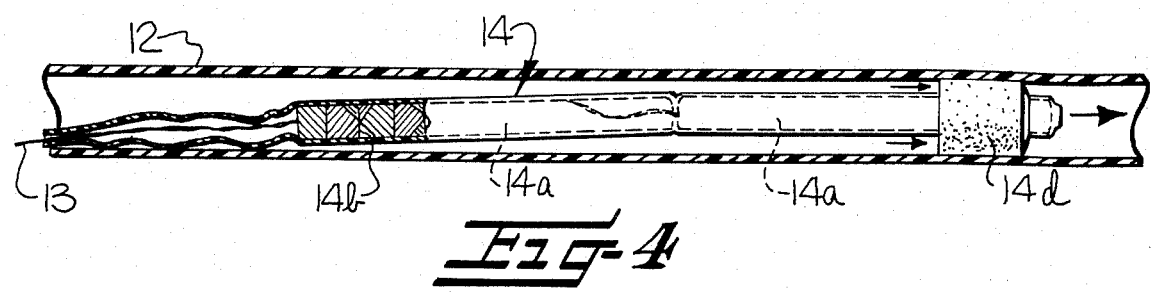
FIG. 4 is an expanded view of the exit portion of tube shown in FIG. 3, showing the exiting line package in more detail.
Figure 5:
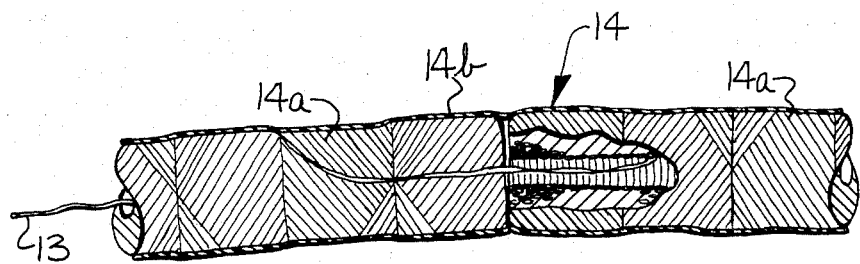
FIG. 5 is a further expanded view of the line package units of the line package shown in FIG. 4, showing how pull line extends from one line package unit to the next.

Referring now to FIGS. 3 through 5, illustrated therein is one method of how tubing 12 may be provided therein with pull line 13. As shown in FIG. 3, a line package 14 is positioned in the entrance end 12a of the roll 11 of tubing leaving a trailing end 13a of pull line 13 outside and adjacent to entrance end 12a.

A pressure source P is then applied to entrance end 12a and activated whereby line package 14 is propelled through the roll 11 of tubing. Line package 14 is comprised of a plurality of line package units 14a. The line package units are desirably wound tightly in a coreless fashion and are adapted to successively unwind from the inside of each line package unit 14a so that pull line 13 will be paid off freely from the trailing unit 14a with little if any restriction. As shown particularly in FIG. 5, the pull line 13 of each trailing line package unit 14a has its outer end connected to the inner end of the pull line 13 of the adjacent preceding line package unit 14a with the rearmost line package unit 14a adapted to unwind first.

The plurality of line package units 14a are surrounded by and connected together by a tube 14b of thin film material. This tube 14b serves to provide overlying protection for the pull line 13 of the line package units 14a and also serves for interconnecting the line package units 14a for moving of the line package units 14a as a unitary line package 14 through tubing 12. The tube 14b of thin film material may be formed from a variety of thin film plastic materials such as polyvinyl chloride or polyethylene. Polyvinyl chloride film is preferred and is desirably readily stretchable so as to flexibly interconnect the interconnected line package units 5 14a.

As shown in FIG. 3, when line package 14 is introduced into tubing 12 it is comprised of a plurality of substantially full line package units 14a. And as described above, as line package 14 is passed through tubing 12 a continuous length of pull line 13 is passed through the roll 11 of tubing. As this occurs the line package units are serially depleted and exhausted, beginning with the rearmost package unit and proceeding forwardly. Finally as line package 14 exits the coil 11 from the exit end 12b of the tubing, only a few number of line package units 14a remain followed by the film of tube 14b.

In light of the curvature of roll 11, certain considerations must be taken into account in order for line package 14 and its line package units 14a to be adapted to pass readily through roll 11. For example, providing 1,000 feet of 50 pound or heavier pull test nylon pull rope in a single line package will result in a package too long and too large in diameter to readily pass through such a roll 11. Therefore, in order to pass acceptable strength pull line 13 through coil 11 a plurality of line package units 14a of approximate size, shape and spacing are utilized. The units 14a may be of an external diameter substantially smaller than the inside diameter of tubing 12 and of such length that they may in essence "link through" the curvature of the coil 11, as shown in FIG. 3. Alternatively, the units 14a, may be formed so as to be readily flexible so that they may readily bend along their lengths when passing through the curves of coil 11. As another alternative, units 14a may be arranged and maintained in a sufficiently spaced apart relation within tube 14b so that the units may essentially "link through" the curves of coil 11.

With further regard to passing line package 14 through coil 11 by fluid pressure, where the internal diameter of tubing 12 is somewhat larger than the outside diameter of line package 14, as shown in FIGS. 3 and 4, line package 14 desirably comprises piston means 14d which is adapted to form a seal with the inner wall of tubing 12 to facilitate passing line package 14 through tubing 12 by fluid pressure. This piston means 14d is preferably formed of a compressible foam material and is cylindrically shaped to snugly receive the line package 14 and form a seal with the inner wall of tubing 12. Piston means 14d is desirably connected to and carried by the leading end of the leading line package unit 14c.

Figure 6:
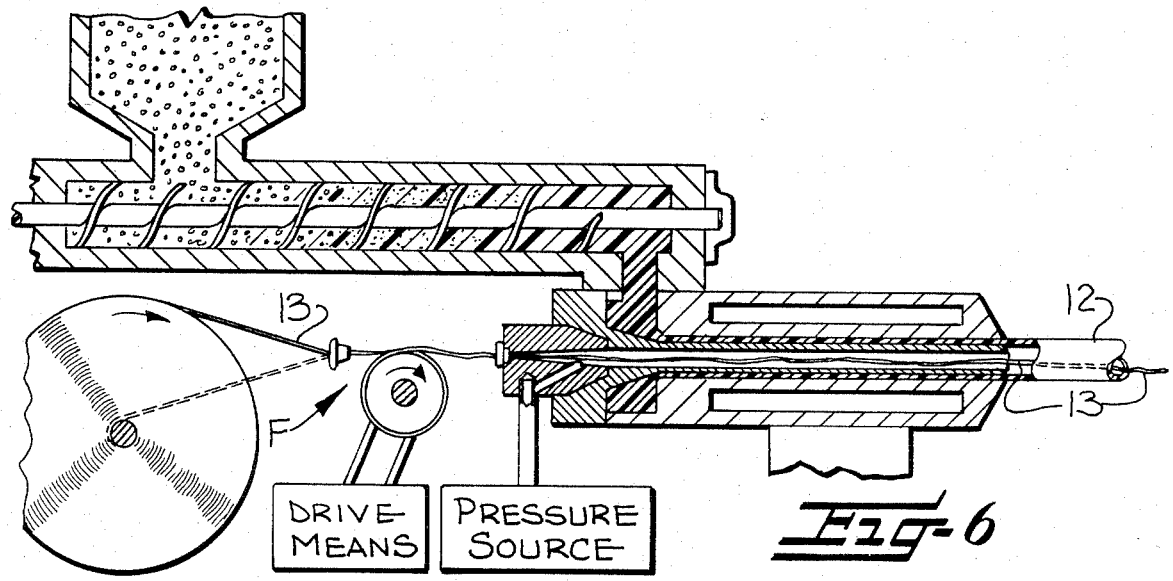
FIG. 6 is a fragmentary schematic side elevational view substantially shown in longitudinal section for clarity showing an interim step of extruding a tubing while positioning a pull line therein.
Figure 7:
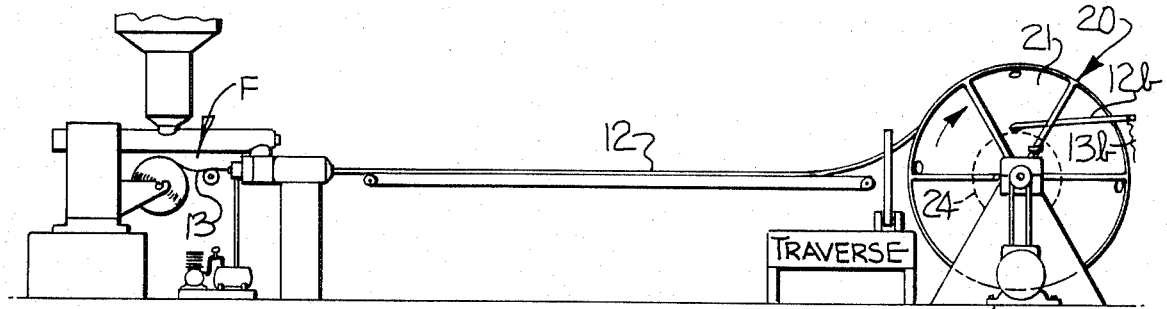
FIG. 7 is a further fragmentary schematic side elevational view showing further steps of forming the roll of wound tubing of the apparatus of the invention.

FIGS. 6 and 7 illustrate another method of providing a conduit tubing 12 with a pull line 13 positioned therein. In this method a conventional plastic tubing extrusion apparatus is modified to include a pull line feed mechanism F such that as tubing 12 is being extruded and formed, pull line 13 is concurrently fed into the tubing 12. As shown in FIG. 7, after the length of tubing 12 has cooled and set up with pull line 13 therein, it is wound into a roll of wound tubing 11 by winding mechanism W.

This latter method, if desired, allows a pull line 14 of substantial strength of from about 500 to about 1,000 pounds of pull strength to be directly included in the tubing 12. Thus, utilizing this latter method it is possible to supply a roll 11 of wound tubing containing, in essence, a pull rope already positioned therein so as to avoid the usual interim field step of pulling a length of pull rope through the tubing with a length of pull line.

In the drawings and specification, there has been set forth typical preferred embodiments of the invention, and although specific terms are employed, they are used in a generic and descriptive sense only and not for purposes of limitation.

That which is claimed is:

1. An apparatus for facilitating field installation of long runs of electrical conductor and fiber optic lines in extended lengths of conduit tubing, said apparatus comprising a roll of wound tubing adapted for use as conduit tubing and having a length of at least 700 feet, and a pull line extending through the entire length of the wound tubing with opposite ends of the pull line being secured adjacent respective opposite ends of the wound tubing, said pull line having a tensile strength of at least about 45 pounds such that it will have sufficient strength to accomplish subsequent installation operations in the tubing.

2. An apparatus according to claim 1 wherein said pull line is formed of stretchable material to provide an increased effective length of pull line, if needed, when said tubing is unwound.

3. An apparatus according to claim 1 wherein said tubing is corrugated and when unrolled is normally stretched and extended.

4. An apparatus according to claim 1 wherein the length of pull line in the wound tubing is less than the rectilinear length of the tubing, and wherein said pull line is stretchable for providing an increased effective length of pull line to compensate for the needed additional length when the tubing is unwound.

5. An apparatus according to any one of claims 2, 3 or 4 wherein said pull line is sufficiently stretchable to provide an increased effective length of pull line of at least about 15%.

6. An apparatus according to claim 1 including a flanged carrier on which said roll of tubing is wound and carried, said flanged carrier having openings in the flanges thereof through which the opposite ends of the tubing extend for ready access thereto.

7. An apparatus according to claim 1 wherein said pull line has a tensile strength of at least about 500 pounds so that it may effectively function as a pull rope in subsequent pulling operations.

* * * * *